United States Patent [19]
Hinrichsen

[11] Patent Number: 5,086,272
[45] Date of Patent: Feb. 4, 1992

[54] APPARATUS FOR DISTINGUISHING BETWEEN OPPOSED DIRECTIONS OF RELATIVE MOTION OF A PART HAVING MAGNETIC VARIATIONS

[75] Inventor: Uwe Hinrichsen, Braunschweig, Fed. Rep. of Germany

[73] Assignee: Volkswagen AG, Fed. Rep. of Germany

[21] Appl. No.: 537,045

[22] Filed: Jun. 12, 1990

[30] Foreign Application Priority Data

Jun. 20, 1989 [DE] Fed. Rep. of Germany ....... 3919993

[51] Int. Cl.$^5$ .......................... G01B 7/14; G08B 21/00
[52] U.S. Cl. .......................... 324/207.13; 324/207.15; 324/207.22; 324/207.25; 340/672
[58] Field of Search .......... 324/165, 173, 174, 207.11, 324/207.13, 207.15, 207.16, 207.17, 207.22, 207.23, 207.24, 207.25; 340/672

[56] References Cited

U.S. PATENT DOCUMENTS 3,969,677 7/1976 Woyton ............................. 324/165
4,725,776 2/1988 Onodera et al. ............... 324/207.21

FOREIGN PATENT DOCUMENTS 3113538 12/1982 Fed. Rep. of Germany .
3134020 3/1983 Fed. Rep. of Germany .
3709182 9/1987 Fed. Rep. of Germany .

Primary Examiner—Walter E. Snow
Attorney, Agent, or Firm—Brumbaugh, Graves, Donohue & Raymond

[57] ABSTRACT

In the embodiments disclosed in the specification, an apparatus for distinguishing between opposed directions of motion of a part having spaced magnetic variations contains an inductive magnetic sensor disposed adjacent to the path of motion of the variations and having portions with different magnetic couplings with the magnetic variations spaced in the direction of motion of the part.

7 Claims, 3 Drawing Sheets

APPARATUS FOR DISTINGUISHING BETWEEN OPPOSED DIRECTIONS OF RELATIVE MOTION OF A PART HAVING MAGNETIC VARIATIONS

BACKGROUND OF THE INVENTION

This invention relates to devices for distinguishing between opposed directions of motion of a part.

Heretofore, devices for distinguishing between opposite directions of motion of a part have included sensors displaced from each other in the direction of motion of the part, and they require a relatively large expenditure, particularly since their positioning depends upon the distance between optical or magnetic variations in the part.

German Offenlegungsschrift No. 3 134 020 discloses an apparatus for determining the speed and direction of rotation of a shaft which has a rotor of soft magnetic material with a plurality of radially directed poles disposed at different angular spacings and a stator with two oppositely energized excitation coils and a detecting coil. The apparatus is arranged so that the two excitation coils induce oppositely directed voltage signals in the detecting coil, and the direction and speed of rotation of the shaft are determined from the time sequence and direction of the detected voltage signals. This apparatus is costly, not only in terms of structural expense and space required, i.e., several coils on one stator, some with outside excitation, but also in terms of manufacturing cost because of the complicated rotor structure.

An optoelectronic motion-detecting device disclosed in German Offenlegungsschrift No. 3 709 182 is intended only to distinguish between two directions of motion of an element which are at an angle of less than 180°. That device has a slit and a diaphragm partially occluding the slit disposed between a source of light and two photodetectors, the slit and the diaphragm being arranged so that, upon motion of the element in one direction with slit edges oblique relative to that direction of motion, the size of slit intervals extending along both edges changes in the same sense, whereas upon motion of the element in a direction perpendicular thereto the size of the slit intervals changes in opposed senses. The signals produced by these changes are processed to obtain direction-of-motion signals.

Finally, German Offenlegungsschrift No. 3 113 538 discloses a device for identifying the direction of motion of a vehicle by providing magnetic induction loops. In that device, the absolute values of the rising and falling slopes of a nonsymmetric signal generated by an induction loop of magnetically asymmetrical, for example triangular, configuration are taken as a criterion for identifying the direction of motion. That disclosure deals with a special case, i.e., an arrangement for road traffic control and, moreover, it utilizes a very specific technology, i.e., induction loops which generate nonsymmetric signals, thereby requiring an active electromagnetic system.

SUMMARY OF THE INVENTION

Accordingly, it is an object of the present invention to provide an arrangement for distinguishing opposed directions of motion which overcomes the above-mentioned disadvantages of the prior art.

Another object of the invention is to provide a motion-direction detector utilizing passive magnetic induction sensors which is simpler in construction and less expensive than prior art devices using such sensors.

These and other objects of the invention are attained by providing a moving part having an element with magnetic variations and an inductive sensor adjacent to the path of motion of the variations which has different responses to magnetic coupling with the magnetic variations depending on the direction of motion of the part with respect to the sensor. The term "motion" here refers to relative motion between the part and the sensor, which need not necessarily be stationary.

A special advantage of the invention is that a conventional sensor of proven effectiveness of the type widely used, for example, to determine the speed or crank angle of an internal combustion engine, is sufficient. According to the invention, such a conventional sensor is used in a novel way, for example, by oblique placement thereof or with a special form of pole shoe, i.e., the face area of an armature of the sensor, so that the voltages induced by the magnetic variations of the part upon relative linear motion or rotation will have different amplitudes according to direction of motion or rotation. As a result, a processing circuit which responds to the signals may also be of very simple construction.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
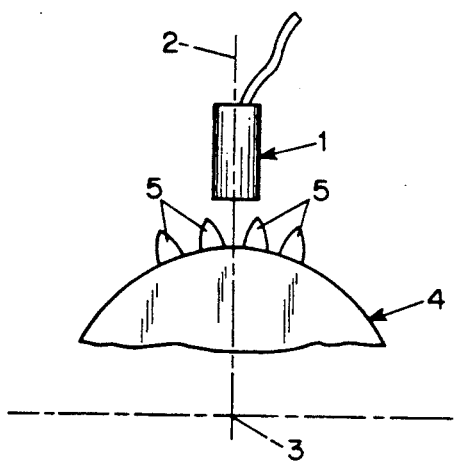
FIG. 1 is a schematic fragmentary view of a rotating part having magnetic variations illustrating a conventional inductive sensor arrangement.

Referring first to FIG. 1, which illustrates a prior art arrangement, an inductive sensor 1 is positioned so that its centerline 2 extends radially with respect to the center 3 of a gear 4 which is the moving part. The gear 4 has peripheral teeth 5 which constitute periodically active magnetic variations as the gear rotates. The motion of the teeth 5 beneath and past the inductive sensor 1 induces voltage pulses in the sensor, whose shape and sequence are independent of the direction of rotation of the gear 4. Hence, with this arrangement no information is available from the sensor as to the direction of rotation of the gear 4.

At this point it should be noted that the same result will be obtained if the gear 4 is replaced by a part having magnetic variations which moves linearly rather than rotationally.

Figure 2:
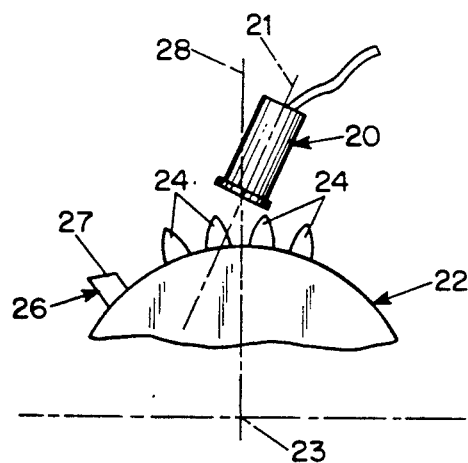
FIG. 2 is a schematic view similar to that of FIG. 1 showing a first embodiment of the invention with a sensor in an oblique disposition.

Considering now a first representative embodiment of the invention as illustrated in FIG. 2 by way of example, a sensor 20 is of the same type shown in FIG. 1, but it is positioned with its centerline 21 extending obliquely to the adjacent portion of a rotating gear 22 as seen from the side so that the centerline 21 does not pass through the axis of the gear 22. As with the gear shown in FIG. 1, the gear teeth 24, which constitute magnetic variations, have symmetric shapes in the directions of motion in this embodiment. Because of the oblique disposition of the centerline 21 of the inductive sensor 20, and hence of the armature 25 of the sensor, however, a more gradual approach of each of the magnetic variations 24 to the armature 25 takes place upon rotary motion of the gear in the clockwise direction than during rotary motion in the counterclockwise direction. Thus, the armature 25 of the sensor has regions which are displaced from each other in the direction of motion of the magnetic variations 24 that exhibit different couplings with the magnetic variations. This results in different amplitudes of the voltages induced in the sensor 20 so that, using an appropriate processing circuit, for example in the nature of an amplitude discriminator, the direction of rotation of the gear 22 can be determined.

Another embodiment of the invention is also illustrated by way of example in FIG. 2. In this case, the gear has a tooth 26 constituting a magnetic variation with a crest surface 27 that is oblique to the direction of motion. Thus, the tooth height on the right side, as seen in FIG. 2, is less than the tooth height at the left side. In this case, since the voltage variations induced in the sensor 20 are produced by the oblique setting of the crest surface 27 of the magnetic variation 26, the centerline 21 of the sensor may be oriented in the conventional manner shown in FIG. 1 so that it lies on the radius 28 of the gear 22. It will be understood, of course, that several such teeth providing asymmetric magnetic variations may be included in this embodiment of the invention.

In a further modification of the embodiment shown by way of example in FIG. 2, the sensor may be disposed so that its centerline coincides with the radius 28 as in FIG. 1, but the face of the armature or pole shoe 25 of the sensor is oriented at an angle other than 90° to the centerline 21 so that the pole shoe 25 maintains an oblique arrangement such as shown in FIG. 2.

Figure 3:
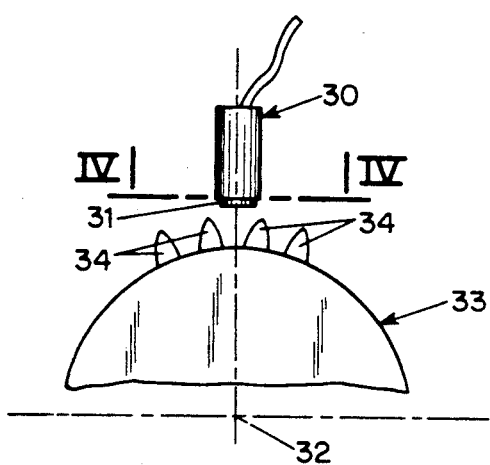
FIG. 3 is a schematic side view illustrating another embodiment of the invention.
Figure 4:
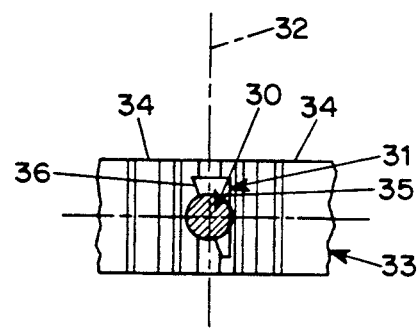
FIG. 4 is a sectional view of the embodiment shown in FIG. 3, taken along the line IV—IV in FIG. 3 and looking in the direction of the arrows.

In the arrangement shown in FIG. 3, an inductive sensor 30 having an armature or pole plate 31 is aligned with the radius 32 of a gear 33. The gear 33 has a series of identical peripheral teeth 34 constituting magnetic variations which move beneath the armature 31 as the gear rotates. In this embodiment, as shown in FIG. 4, the armature 31 has regions spaced from each other in the direction of motion of the gear with different dimensions in the direction transverse to the direction of motion. Thus, a first boundary edge 35 of the armature, at the right as viewed in FIG. 4, is perpendicular to the plane of motion, whereas a second boundary edge 36, at the left as seen in FIG. 4, is oblique to the plane of gear motion so that the dimension of the armature parallel to the edge 35 decreases toward the left side of the armature. This arrangement produces different amplitudes of induced voltages depending on the direction of motion of the gear.

The same result is obtained if the directional asymmetries are produced by an oblique tooth profile on the leading or trailing side of each tooth. In that case, only one armature edge will be parallel to the tooth flanks as seen in plan view.

The same effect can also be obtained if the cross-sectional shapes of the teeth 34 providing the magnetic variations are chosen with suitable asymmetry rather than the cross-sectional shape of the armature 31. As a rule, however, both in terms of manufacturing outlay and load-transmitting functions of the teeth 34, it is more expedient to provide an armature of varying dimensions.

Figure 5:
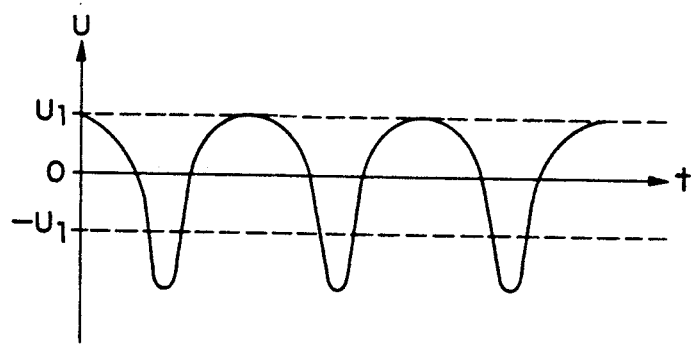
FIG. 5 is a graphical representation showing the variation of the voltage U induced in the sensor shown in FIGS. 3 and 4 as a function of time t upon rotation of the gear in the clockwise direction.
Figure 6:
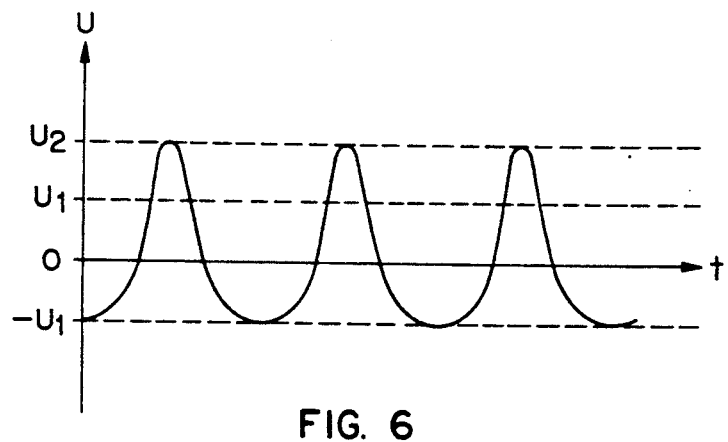
FIG. 6 is a graphical representation similar to that of FIG. 5 showing the signal shape produced in the sensor of FIGS. 3 and 4 by rotation of the gear in the counterclockwise direction.

In the graphical representations shown in FIGS. 5 and 6, still by way of example, the voltage U induced in the sensor 30 as a function of the time t during rotations of the gear 33 in the clockwise direction is illustrated in FIG. 5 and in the counterclockwise direction is illustrated in FIG. 6. During the clockwise rotation, the positive voltage amplitude is limited to the value $U_1$, whereas during counterclockwise rotation of the gear 33, a positive voltage amplitude $U_2$, considerably greater than the amplitude $U_1$, is produced. The difference between these two peak values may be utilized mensurationally as a criterion to indicate the prevailing direction of rotation or, in more general terms, direction of motion, in the manner described hereinafter.

Figure 7:
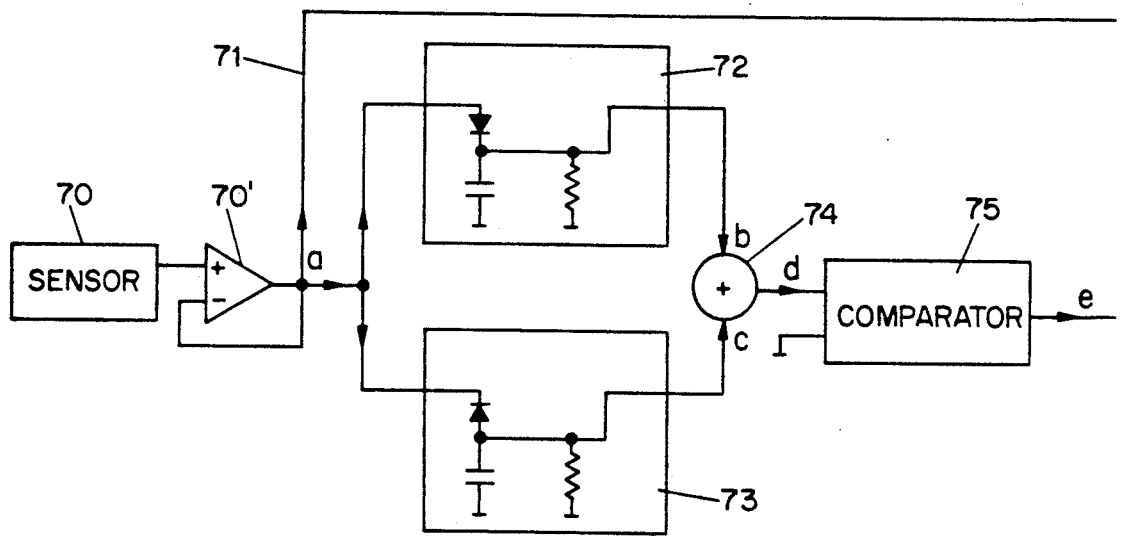
FIGS. 7, 9 and 10 are schematic block diagrams illustrating circuitry for processing signals produced by a sensor arrangement of the type shown in FIGS. 3 and 4.
Figure 8:
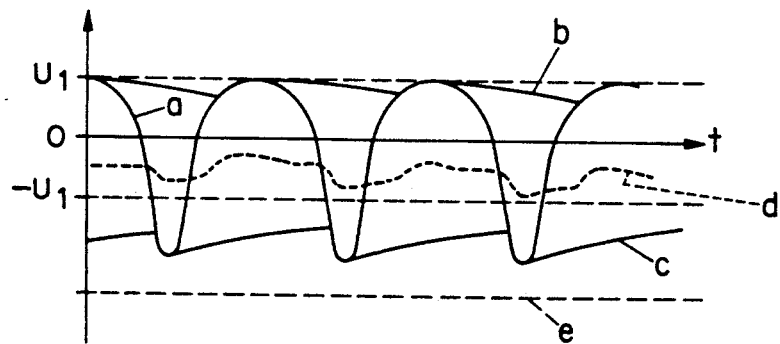
FIGS. 8 and 11 are graphical representations showing voltage signals at selected points in the circuits of FIGS. 7 and 9, respectively.

FIG. 7 illustrates an inductive sensor arranged according to the invention adjacent to magnetic variations such as the teeth, here not shown, of a moving part such as a gear. The output signals a from the sensor, which may be supplied by way of a signal line 71 to a tachometer (not shown), behave as a function of time in the manner again indicated by the curve designated a in FIG. 8, assuming clockwise gear motion as shown in FIG. 5. In the processing circuit of FIG. 7, the signals are supplied by way of an operation amplifier 70' for signal decoupling to two peak memories 72 and 73 for storing positive and negative peak signals respectively, which are so designed that their output signals b and c decay with a given time constant. The behavior of these output signals as a function of time is also illustrated in FIG. 8. Both of the signals b and c are supplied to an addition stage 74, producing an output signal d which is positive or negative according to the prevailing direction of motion or rotation of the gear 33. In the assumed clockwise direction of motion, on which FIG. 5 was also based, the sum signal d will be positive. The prevailing sign of the sum signal d is evaluated, or determined, in a comparator 75, which supplies an appropriate direction-of-motion signal e to a display device or the like (not shown).

In the case of passive inductive sensors, uncertainties may arise because they produce usable output signals only when the speed of motion or rotation is above a certain minimum value. Hence, it may be expedient to distinguish not only between two cases, namely the two directions of motion, but to consider a third case as well, in which the direction of motion is not indicated with certainty because the linear or rotational speed is too low for a definite signal acquisition in the sensor. In principle, this distinction can readily be made with the aid of the computer, if the absolute value of the speed is also determined. In terms of hardware, the distinction can be obtained by a modification of the evaluating circuitry shown in FIG. 7 which is illustrated in FIG. 9.

Figure 9:
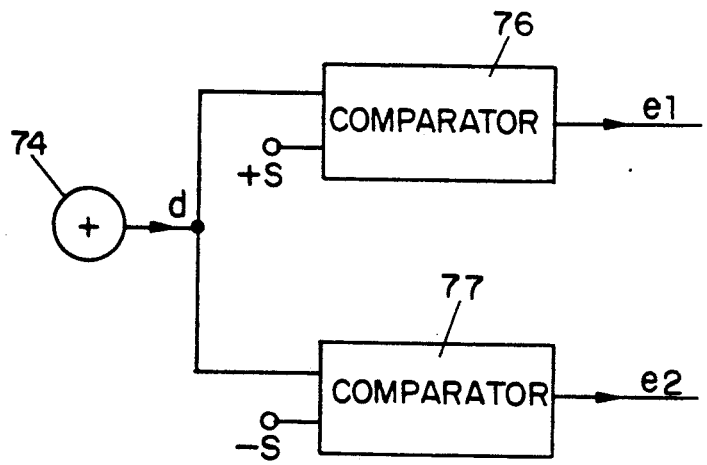

The modified portion of the processing circuit of FIG. 9 commences with the addition stage 74 shown in FIG. 7. Instead of the single comparator 75 used in FIG. 7, two comparators 76 and 77 are provided, to which threshold values or comparison potentials $+S$ and $-S$ having the same absolute value but different sign are supplied. One of the comparators 76 and 77, depending on the sign of the signal d, will deliver an output signal $e_1$ or $e_2$, respectively, only when the sum signal d is at least equal in absolute value to the quantity S. Consequently, the signal $e_1$ or $e_2$ represents an unambiguous indication of the prevailing direction of motion. If neither of the comparators 76 and 77 delivers an output signal, the direction of motion or rotation is indeterminate.

Figure 10:
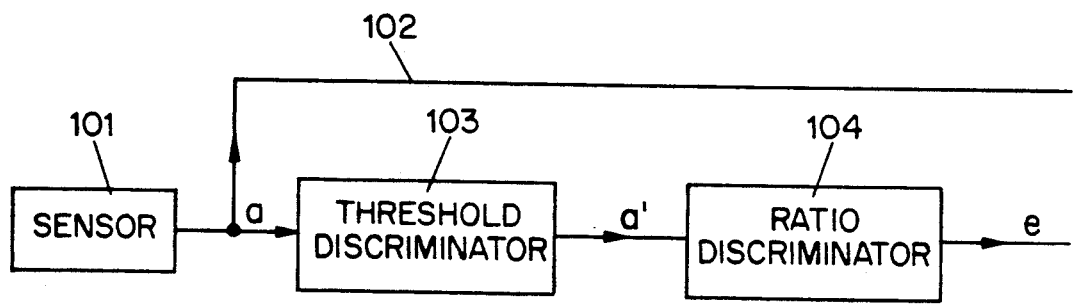

The sensor signals may alternatively be evaluated digitally. An embodiment exemplifying a digital evaluation system will now be explained with reference to FIGS. 10 and 11. In FIG. 10, an inductive sensor 101 produces signals a in response to magnetic variations which are supplied both by way of a line 102 to a rotational speed sensor and to a threshold discriminator 103 which is the first component of the processing circuit. The sensor output signals a are shown plotted against time in FIG. 11. In this case, as in FIG. 8, it is assumed that the direction of motion or rotation is the same as that on which FIG. 5 is based. For the opposite direction of motion, the graph of FIG. 6 would apply.

Figure 11:
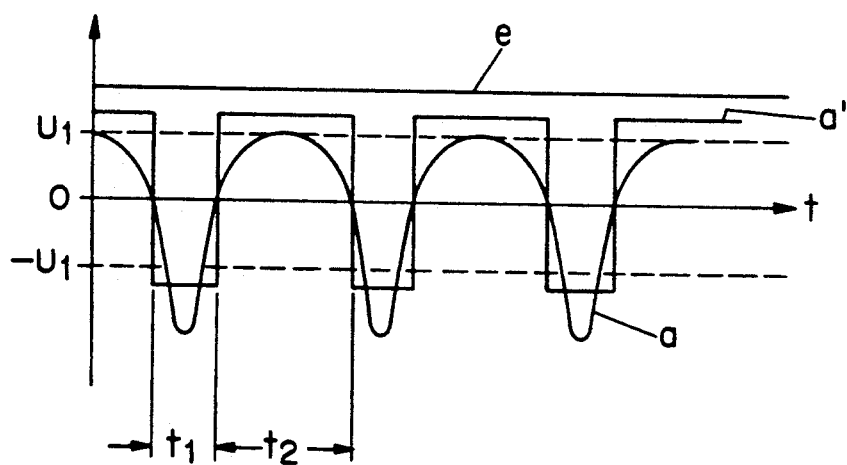

A comparison of the curves in FIGS. 5 and 6 shows that not only are the amplitudes different, but the duration of the positive and negative intervals of the signals also differ. The processing circuit of FIG. 10 utilizes this fact by digitizing the signals a from the sensor 101 in the signal discriminator 103 so that square wave signals a′ are formed as shown in FIG. 11. A duration ratio discriminator 104 determines whether the duration ratio of the square wave signals a′ is greater than or less than 0.5. This is a criterion establishing which of the two mutually opposed directions of motion the part in question is taking, such as the direction of motion of the gear assumed in this case.

The ratio discriminator 104 may contain two conventional pulse counters, each of which determines one of the times $t_1$ and $t_2$. Both counters operate a flip-flop that is set if, at the end of $t_2$, the quantity $t_2 > t_1$, and reset if at the end of time $t_1$, the quantity $t_1 > t_2$. The output signal e of the flip-flop then indicates the direction of motion.

It will be understood that still other embodiments of the processing circuitry are possible. For example, instead of the two counters mentioned, a single forward-backward counter may be employed, which is set to zero at the beginning of $t_1$, counts down during $t_1$, but counts up during $t_2$, and the status of the counter at the end of $t_2$, i.e., greater or less than zero, is stored in a flip-flop.

In this digitized processing circuit, it may be expedient to utilize two duration ratio discriminators, for example, delivering output signals only when the duration ratio of the rectangular signals a′ is, for example, greater than 0.6 or less than 0.4, analogous to the arrangement shown in FIG. 9, in order to achieve more dependable direction-of-motion information.

The invention thus provides a device of very simple construction for distinguishing between oppositely-directed linear or rotational motions of a part, requiring practically no additional expense in comparison with conventional arrangements for determining the speed or position of a rotary part.

Although the invention has been described herein with reference to specific embodiments, many modifications and variations therein will readily occur to those skilled in the art. Accordingly, all such variations and modifications are included within the intended scope of the invention.

I claim:

1. Apparatus for distinguishing between opposed directions of relative motion of a part having magnetic variations comprising magnetic sensor means disposed adjacent to the path of the magnetic variations of the part and having different magnetic couplings with the magnetic variations in the part in the direction of relative motion of the part with respect to the sensor means, wherein the sensor means includes armature means having portions spaced at different distances from the magnetic variations and wherein the portions of the armature means have different dimensions in a direction transverse to the direction of motion of the magnetic variations.

2. Apparatus according to claim 1 including circuit means for digitizing signals produced by the sensor mean and means for determining the duration ratio of the digitized signals.

3. Apparatus for distinguishing between opposed directions of relative motion of a part having magnetic variations comprising magnetic sensor means disposed adjacent to the path of the magnetic variation of the part and having different magnetic couplings with the magnetic variations in the part in the direction of relative motion of the part with respect to the sensor means, wherein the sensor means includes armature means having portions spaced at different distances from the magnetic variations, including circuit means responsive to signals produced by the sensor means for determining the amplitude difference of signals generated by the sensor means.

4. Apparatus according to claim 3 wherein the circuit means includes means for digitizing the signals supplied by the sensor means and means for determining the duration ratio of the digitized signals.

5. Apparatus for distinguishing between opposed directions of relative motion of a part having magnetic variations comprising magnetic sensor means disposed adjacent to the path of the magnetic variations of the part and having different magnetic couplings with the magnetic variations in the part in the direction of relative motion of the part with respect to the sensor means, including circuit means responsive to signals produced by the sensor means for determining the amplitude difference of signals generated by the sensor means, wherein the circuit means comprises signal peak memory means having predetermined decay time constants for positive and negative peaks in the output signals from the sensor means, signal addition means for adding signals received from the memory means, and signal comparison means for comparing signals from the addition means.

6. Apparatus according to claim 5 wherein the comparison means comprises two comparators to which comparison voltages of like absolute value and opposite sign are supplied.

7. Apparatus for distinguishing between opposed directions of relative motion of a part having magnetic variations comprising magnetic sensor means disposed adjacent to the path of the magnetic variations of the part and having different magnetic couplings with the magnetic variations in the part depending upon the direction of relative motion of the part with respect to the sensor means, said apparatus comprising circuit means which include means for digitizing signals supplied by the sensor means and means for determining the duration ratio of the digitized signals.

* * * * *